(12) United States Patent
Franck et al.

(10) Patent No.: US 12,434,779 B2
(45) Date of Patent: Oct. 7, 2025

(54) TRACK ASSEMBLY

(71) Applicant: Loc Performance Products LLC, Plymouth, MI (US)

(72) Inventors: Randall F Franck, Berne, IN (US); Kevin Osterholt, Coldwater, OH (US)

(73) Assignee: Loc Performance Products, LLC, Plymouth, MI (US)

( * ) Notice: Subject to any disclaimer, the term of this patent is extended or adjusted under 35 U.S.C. 154(b) by 453 days.

(21) Appl. No.: 18/070,901

(22) Filed: Nov. 29, 2022

(65) Prior Publication Data
US 2024/0174308 A1    May 30, 2024

(51) Int. Cl.
*B62D 55/108*    (2006.01)
*B62D 55/30*    (2006.01)

(52) U.S. Cl.
CPC ......... *B62D 55/1086* (2013.01); *B62D 55/30* (2013.01)

(58) Field of Classification Search
CPC .... B62D 55/30; B62D 55/305; B62D 55/104; B62D 55/108; B62D 55/1086; B62D 55/14
See application file for complete search history.

(56) References Cited

U.S. PATENT DOCUMENTS

| | | | | |
|---|---|---|---|---|
| 4,361,363 A * | 11/1982 | Livesay | ............... | B62D 55/108 474/134 |
| 4,519,654 A * | 5/1985 | Satzler | ............... | B62D 55/1125 305/132 |
| 5,503,238 A * | 4/1996 | Urbanek | ............... | B62D 11/10 180/6.7 |
| 5,899,542 A * | 5/1999 | Lykken | ............... | B62D 55/1086 305/129 |
| 8,469,465 B2 * | 6/2013 | Wodrich | ............... | B62D 55/14 305/132 |
| 9,452,796 B2 | 9/2016 | Franck et al. | | |
| 9,663,164 B2 * | 5/2017 | Vik | ............... | B62D 55/305 |
| 10,435,092 B2 † | 10/2019 | Stellman | | |
| 10,597,098 B2 * | 3/2020 | Vik | ............... | B62D 55/1086 |
| 11,338,869 B2 | 5/2022 | Kahlig | | |

(Continued)

FOREIGN PATENT DOCUMENTS

| | | |
|---|---|---|
| CN | 212580018 U | 2/2021 |
| CN | 215794123 U | 2/2022 |
| JP | 2020157911 A † | 10/2020 |

*Primary Examiner* — Jason R Bellinger
(74) *Attorney, Agent, or Firm* — Panagos Kennedy PLLC; Bill Panagos; Linda Kennedy

(57) ABSTRACT

An endless vehicle track assembly with improved response to pitch, roll and yaw includes an adjustable main frame supported for tilting movement on an axis transverse to the main frame. The main frame first end is equipped with a tensioning bracket that includes a first axle tube to accommodate a first axle with end wheels in spaced apart relation to each other. The main frame second end is equipped with a pivotal alignment bracket having a second axle tube to accommodate a second axle with a second set of end wheels in spaced apart relation to each other. The main frame body is equipped with a reinforcing bracket pivotally attached to a main frame top side intermediate the first and second ends and equipped with an implement axle tube for pivotal movement relative to said mainframe. A plurality of bogie wheels are attached to the roller beams.

8 Claims, 5 Drawing Sheets

(56) References Cited

U.S. PATENT DOCUMENTS

| 12,060,122 | B2 † | 8/2024 | Allen | |
| 12,269,543 | B2 * | 4/2025 | Sauvageau | B62D 55/12 |
| 2015/0321711 | A1 * | 11/2015 | Vik | B62D 55/24 |
| | | | | 29/525.08 |
| 2018/0118285 | A1 | 5/2018 | Kahlig | |

\* cited by examiner
† cited by third party

TRACK ASSEMBLY

TECHNICAL FIELD

The present disclosure generally relates to a track assembly.

BACKGROUND

Certain land vehicles, including military and commercial agricultural vehicles, move along their pathways using, at least in part, track assemblies. In operation, these vehicles encounter uneven loads and uneven terrain, which can stress the track assemblies and the land vehicles. In some embodiments, a vehicle that is not supported on a track assembly may be pulling an implement that is supported by a track assembly.

It may be desirable for a track assembly to be configured to accommodate uneven loading across track assembly wheels. For endless track assemblies, this includes loading across end wheels for a belt and smaller bogie wheels that engage a bottom or lower run of the belt.

It may also be desirable for a track assembly to provide increased uniform ground contact over uneven terrain. Such increased surface area contact may minimize stresses and vibrations in both the track assembly (and its components) and in the vehicle, or any other implement, supported by the track assembly. The reduction in stresses and vibrations in an implement or vehicle being supported by the track assembly may also reduce any discomfort to the driver of a vehicle, including one that is pulling an implement supported by the track assembly.

BRIEF DESCRIPTION OF DRAWINGS

The embodiments set forth in the drawings are illustrative and exemplary in nature and not intended to limit the subject matter defined by the claims. The following detailed description can be understood when read in conjunction with the following drawings, where like structure is indicated with like reference numerals.

DETAILED DESCRIPTION

All figures are non-limiting exemplary illustrative embodiments of the claims. Modifications to specifically described track assemblies, vehicles, systems, the order of steps in processes, etc., are contemplated. The vehicles and track assemblies and methods are capable of other embodiments and of being practiced and carried out in various ways. Also, it is to be understood that the phraseology and terminology employed herein are for the purpose of the description and should not be regarded as limiting.

Figure 1:
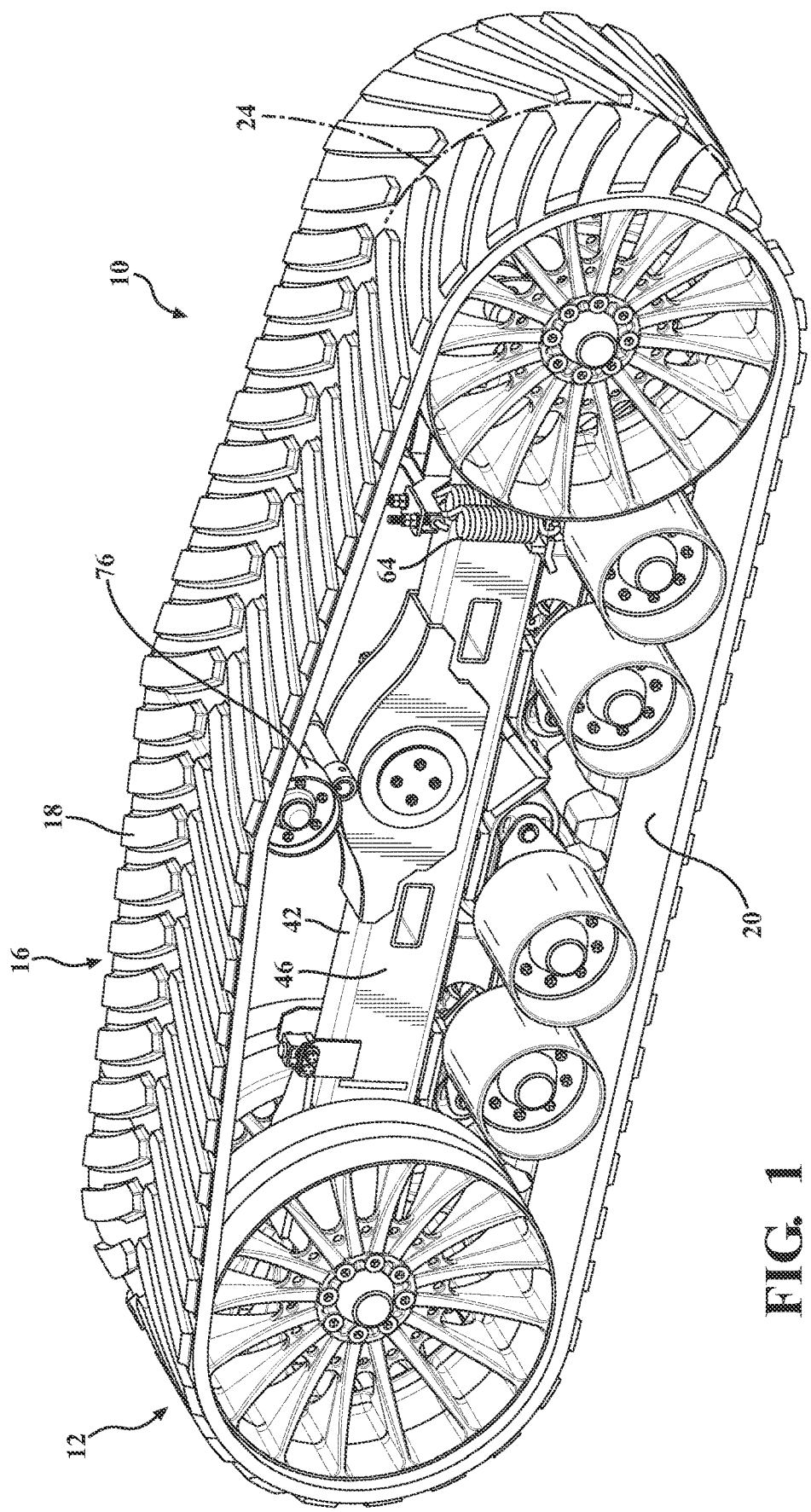
FIG. 1 is a perspective view of an exemplary track assembly.
Figure 2:
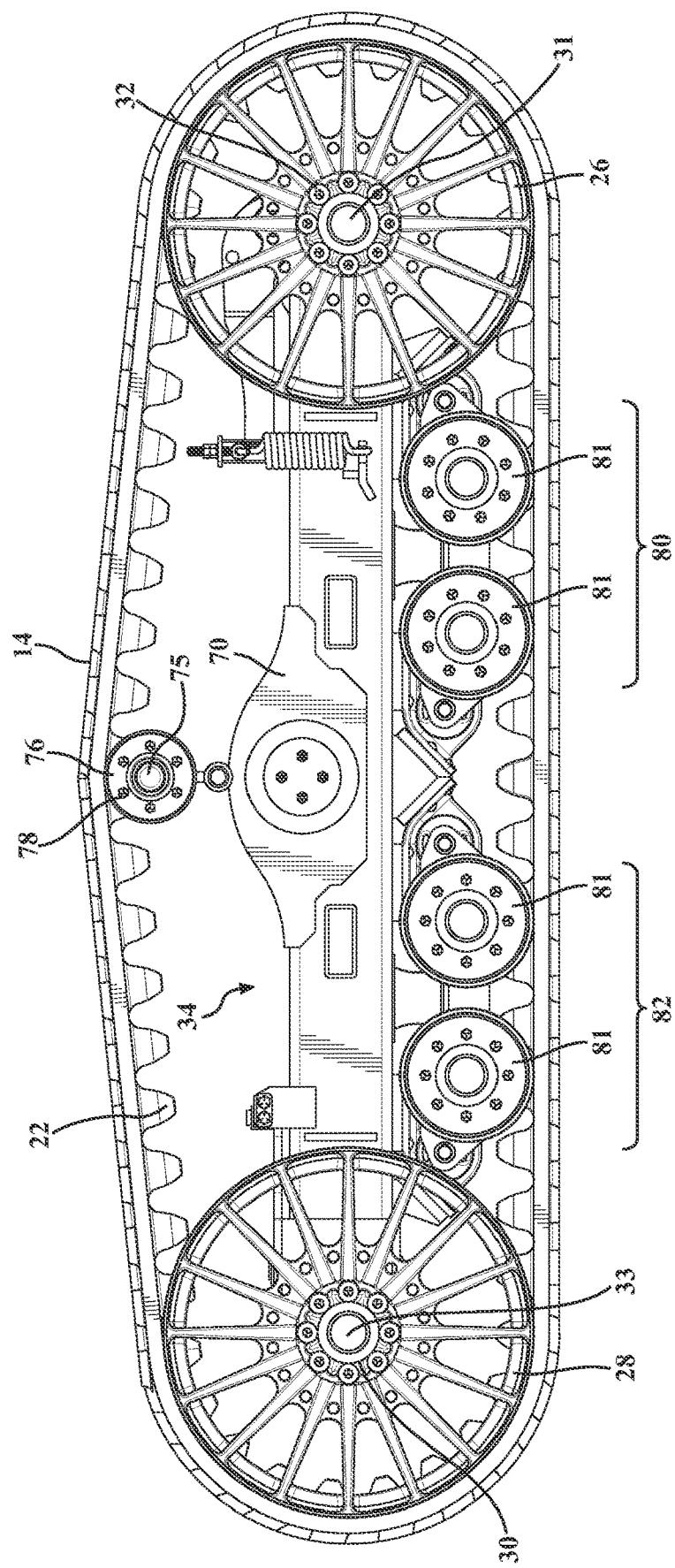
FIG. 2 is a side on plan view of the track assembly of FIG. 1.

Referring to the drawings wherein like numbers refer to like structures, and particularly to FIGS. 1 and 2, an exemplary elongated endless track assembly 10 is illustrated. Endless flexible molded track 12 is shown having an exterior track surface 14, an engineered tread pattern 16 with exterior tread lugs 18 along the exterior track surface. The endless flexible molded track is made of any suitable elastomeric materials, natural rubber, and mixtures thereof.

The inner surface 20 of the elongated endless flexible molded track 12 has longitudinally spaced integral projections called drive lugs or guide lugs 22 along centerline 24 for an implement or cart in the center portion of the belt. The endless flexible molded track extends around the idler wheels 26 and 28 at each opposed end of the adjustable main frame. The idler wheels have hubs 30 secured by bolts 32 to wheel bearings mounted on opposite ends of corresponding axles 31, 33 respectively. The idler wheels 26 and 28 are each a spaced apart pair of idler wheels carried by an axle 31, 33 respectively, transverse to the adjustable mainframe and spaced apart relative to each other to accommodate the lugs 22 on the inner surface of the track.

Figure 3:
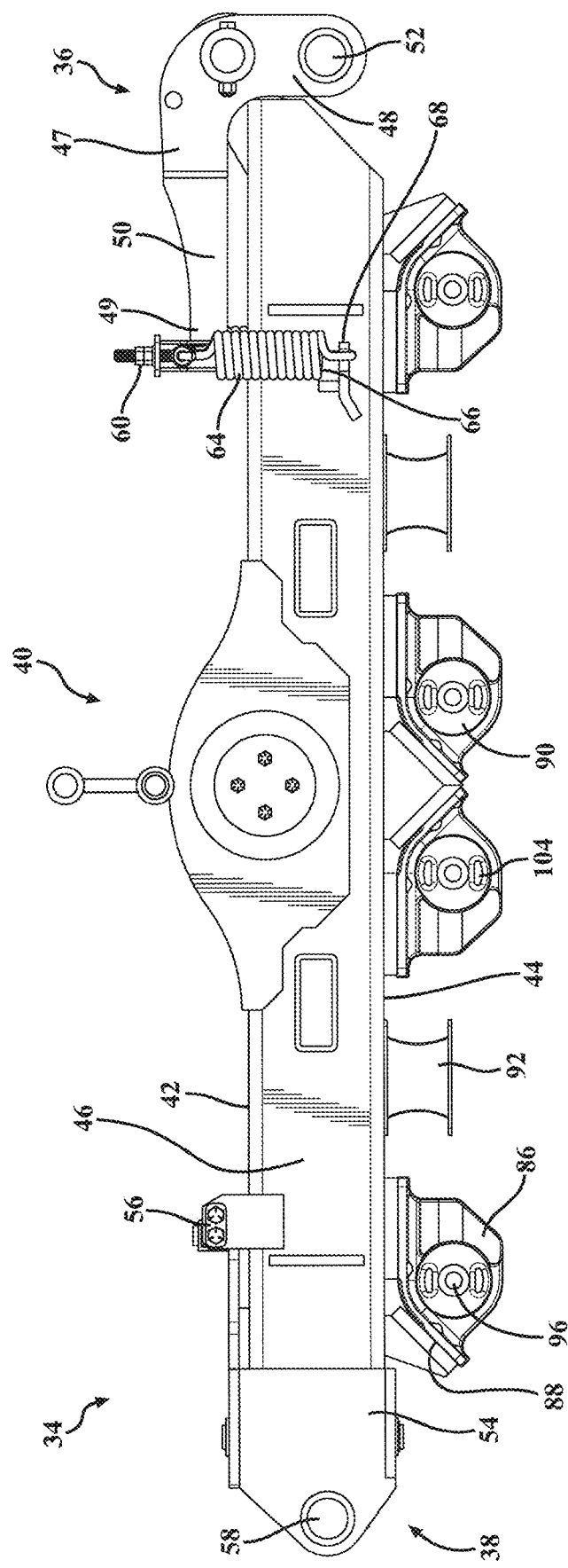
FIG. 3 is a side on plan view of the adjustable main frame showing its construction.

Turning to FIG. 3, the adjustable main frame 34 is shown. The adjustable main frame has spaced apart opposed first end 36 and second end 38 separated by a mainframe body portion 40. The adjustable main frame has a top side 42 separated from a mainframe underside 44 by mainframe body portion sidewalls 46. The side walls are opposed facing relation to each other.

Figure 4:
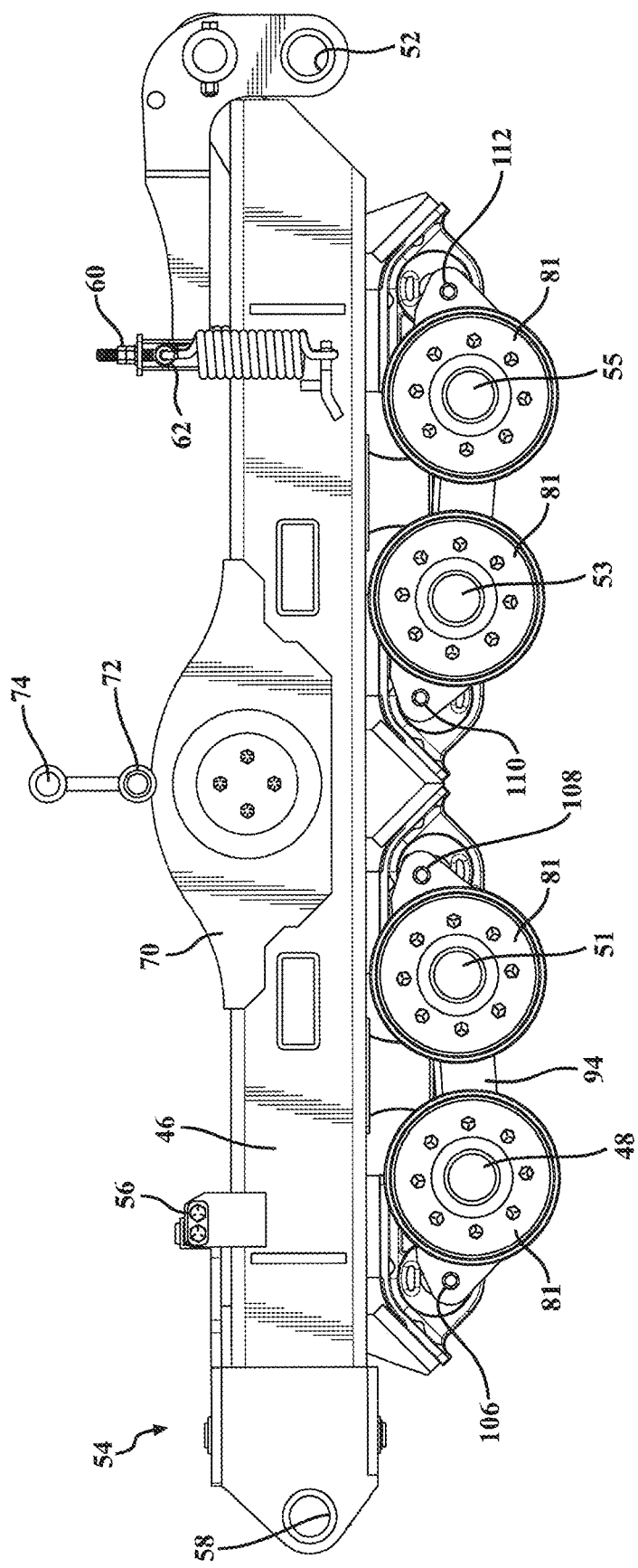
FIG. 4 is a side on plan view of the adjustable main frame of FIG. 3, with roller beams and bogie wheels attached.

As seen in FIGS. 3 and 4, tension bracket 54 is adjustably mounted at 56 to the main frame and carries the tube 58 for axle 33, and the tension bracket 54 is adjustable longitudinally on the main frame for accommodating any stretch in the endless flexible track 12 which may arise from operating conditions or wear in the endless flexible track 12.

Main frame first end 36 is equipped with a pivotal adjustment tensioning bracket assembly 47. The tensioning bracket assembly includes a pivotal tensioning bracket 50 having a first end 48 that carries an axle tube 52 that carries axle 31 for the front idler wheels 26. The tension bracket is shown as "L" shaped, with a pivot end 49 adjustably affixed to pivotal tensioning adjustment bracket assembly 47. The pivotal adjustment bracket is secured to the adjustable main frame by eye bolts 62 and adjustable fasteners shown as nuts 60 through tension springs 64 which are affixed to flange 66 and fastening to the flange by fastener 68, shown as a nut. The pivotal alignment bracket permits selection and adjustment of the mainframe to maintain the desired tension in the endless belt.

The center portion of the frame has a reinforcing brace 70 and a pivot 72 that supports a cross tube 74 which receives the implement axle shaft 75. The pivot 72 is secured to the frame of the implement or equipment supported by the track assembly. The implement shaft 75 carries the pivot wheel 76 secured to a hub 77 by fasteners 78. The pivot 72 provides for pivoting of the track assembly on a transverse or laterally extending axis. The center portion further includes rubber vertical mounts 92 extending from the underside of the mainframe. The rubber vertical mounts are shown as hourglass shaped and may be made of a rubber material. While natural rubber may be used, those skilled in the art recognize that a mixture of natural rubber and styrene butadiene or a mixture of natural rubber and isoprene rubber may also be used. Indeed, any resilient compression material or spring material may be used for vertical mount 92. In addition, although an hourglass shape is discussed, any suitable shape for the vertical mount 92 may be used depending upon the compression rate of the material and the needs of the track assembly.

Turning to FIGS. 3 and FIG. 4, the adjustable main frame is equipped with arcuate bushing mounts 86. The arcuate bushing mounts each have mounting surface 88. Each arcuate bushing mount is configured to accommodate a round rubber bushing 90. The round rubber bushings have a central mount 96 and two compression spaces 104. Those skilled in the art will recognize that any suitable elastomeric resilient material may be used to create the round bushing 90 including, for example, a mixture of natural rubber and styrene butadiene or a mixture of natural rubber and isoprene rubber.

Below the frame are roller or bogie wheels 81 (consisting of a forward set 82 and a rearward set 80) attached to brackets or roller beams 94 which are isolated from the main frame. The bogie wheels are arranged on axle 48, 51, 53, and 55 in opposed spaced part pairs (see FIGS. 1 and 5) with a space 84 between each pair of bogie wheels to accommodate the lug 22 on the endless track. The forward set of four bogie wheels 82 on the first roller beam and a rearward set of four bogie wheels 80 are supported below the adjustable main frame in suspended floating relation by roller beam 94 by fasteners 106, 108, 110, and 112 which pass through opening 96 in the round rubber bushing. Thus, the bogie wheels float vertically, relative to the adjustable main frame while also having pitch roll and yaw compliance provided by the round rubber bushing mounts and vertical rubber mount.

The bogie wheels are substantially smaller than the end idler wheels and are normally held away from the main frame by the rubber mounts. If the implement is a cart for example which has a loaded and an unloaded state, the hardness or rate of the vertical mount can be such that the rollers or bogie wheels always engage the inner surface of the bottom run of the belt both loaded and unloaded.

Figure 6:
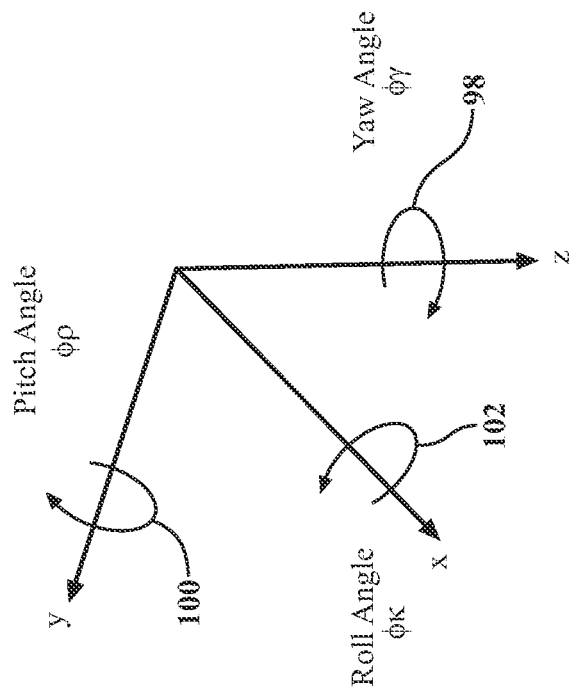
FIG. 6 is a representation of a coordinate system showing pitch, roll and yaw.
Figure 5:
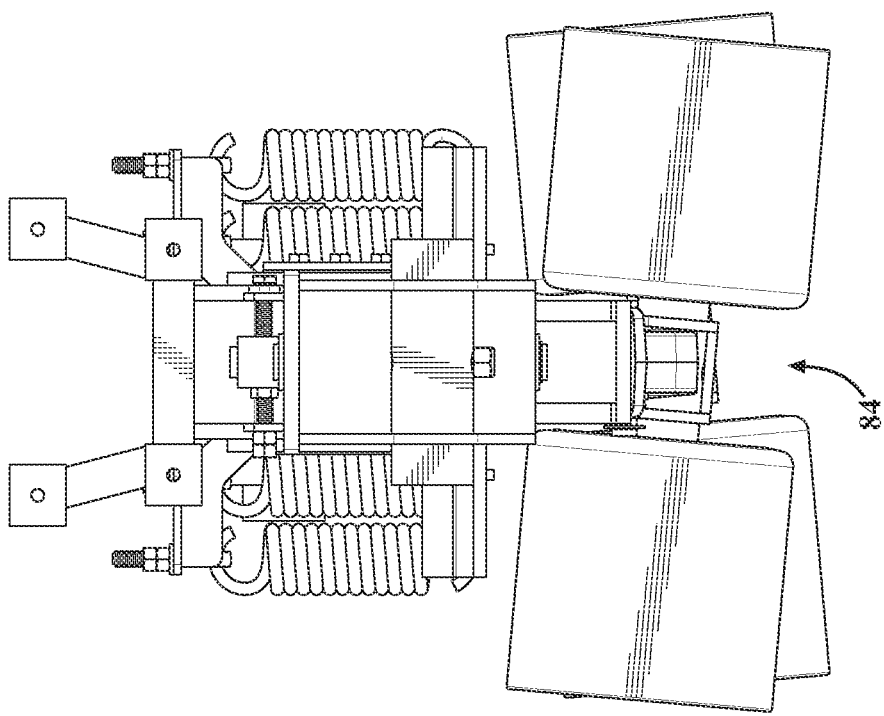
FIG. 5 is a detailed view of one set of bogie wheels showing movement relative to pitch, roll and yaw.

Each set of front bogie wheels and rear bogie wheels is supported for independent vertical and tilting movement relative to the frame by the round bushing mounts. In this regard, reference is made to FIG. 5 showing the bogie wheel responding to roll during operation. As understood by reference to FIGS. 5 and 6, the arrangement as described will accommodate pitch, roll and yaw during operation of the track assembly. FIG. 6 shows a cartesian coordinate system, with an X axis, a Y axis and a Z axis. FIG. 6 describes the pitch angle $\varphi \rho$ of a boogie wheel along a Y axis of movement with the direction of pitch in the direction of arrow 100, the roll angle $\varphi \kappa$ with the direction of roll as indicated by arrow 102 and the yaw angle $\varphi \gamma$ which moves in the direction of arrow 98. The bushing mounts produced by Loc Performance Products LLC' facility in St. Mary's, OH is of a resilient compression member and an integral bracket which are rigidly connected to the main frame by the brackets. The rubber bushing is inserted into the integral bracket and is also connected to the lower roller beam via through bolts. The roller beams are also secured by bolts to a pair of axles having outer end portions which receive the bearings and hubs for the set of four bogie wheels.

The hour shaped vertical mount is produced by Loc Performance Products LLC at its St. Mary's, OH facility and is of a resilient compression member and in this embodiment, is in the form of an hourglass shape, which is engineered for rate based on the size of the implement or cart. The vertical mount can be bolted to the main frame and to the roller frame or have a locking feature with the main frame which holds it in place.

As apparent from the above construction of the track assembly, each set of four suspended bogie wheels is free to float up and down and tilt in both longitudinal and lateral vertical planes against the downward pressure or bias produced by the rubber compression members or springs. That is, the support of the longitudinal center frame of the track assembly by the cross tube permits the entire track assembly to pivot or tilt in a longitudinal vertical plane on a transverse axis.

The bushing mounts permit each bogie support frame and the corresponding set of four bogie wheels to move or float up and down and also tilt forwardly and rearwardly in a longitudinal vertical plane. In addition, the bushing mounts permit each bogie support frame and the corresponding set of four bogie wheels to tilt laterally in a transverse vertical plane in both directions. Pitch, roll and yaw are thereby accommodated. As a result, the lower run of the endless belt engages and follows the contour of the ground with more uniform pressure and thereby provide all of the advantages mentioned above in the summary of the invention.

In addition, when the track assembly is supporting a lighter load, such as an empty grain cart, the bogie wheels press a portion of the lower run of the belt under the bogie wheels downwardly below the portions of the belt contacting the end wheels so that the bogie wheels carry all of the load. As a result, the raised end wheels allow the belt to slope upwardly to the end wheels so that the belt more easily climbs over uneven terrain. The less surface of belt contacting the ground makes for a lighter load on the elongated endless flexible molded track 12 and also reduces the force required to turn the track assembly and reduces tread wear of the track.

The track assembly having been described as above, it can be understood the adjustable main frame is supported for tilting movement on an axis transverse to the main frame. The main frame has spaced apart first end and second end separated by a body extending therebetween, and a topside and an underside in spaced apart relation to each other separated by opposed sidewalls extending therebetween.

The main frame first end is equipped with a tensioning bracket. The tensioning bracket equipped with a first axle tube oriented transverse to the main frame to accommodate a first axle with a first set of end wheels in spaced apart relation to each other. The end wheels are mounted for rotation on parallel transverse axes and the tensioning bracket adjustable longitudinally on said main frame.

The main frame second end is equipped with a pivotal alignment bracket. The pivotal alignment bracket is equipped with a second axle tube oriented transverse to the main frame to accommodate a second axle with a second set of end wheels in spaced apart relation to each other. The second set of end wheels are mounted for rotation on parallel transverse axes.

The main from body portion may be equipped with a reinforcing bracket assembly pivotally attached on said main frame top side intermediate the main frame first end and second end. The reinforcing bracket may be equipped with an implement axle tube oriented transverse to the mainframe for pivotal movement relative to the mainframe. The implement axle tube is adapted to receive an implement axle shaft secured to a vehicle frame and may carry an implement wheel.

The track assembly includes a flexible endless belt extending around the first and second set of end wheels, as well as the reinforcing bracket assembly and having an upper run and a lower run for engaging a travel surface. The track assembly further includes a plurality of bogie wheels each having a transverse axis and each engaging the lower run of the endless track. The bogie wheels are attached to roller beams isolated from the main frame. The bogie wheels include a forward set of four bogie wheels on a first roller beam and a rearward set of four bogie wheels on a second roller beam. The bogie wheels are supported below the main frame in suspended floating relation to the frame. The floating relation includes vertical float and pitch, roll and yaw compliance, and each set of bogie wheels is supported for independent vertical and tilting movement relative to the main frame (see FIG. 6).

Referring generally to the entirety of above description and material incorporated by reference, the text and drawings shall be interpreted as illustrative rather than limiting. Changes in detail or structure may be made without departing from the present disclosure. Particular configurations, assemblies, or components and functions described with respect to one embodiment may be combined, in whole or in part, with those of other embodiments. Well-known operations, components, and elements such as simple attachment devices have not been described in detail so as not to obscure the embodiments described in the specification. While processes, systems, and methods may be described herein in connection with one or more steps in a particular sequence, such methods may be practiced with the steps in a different order, with certain steps performed simultaneously, with additional steps, and/or with certain described steps omitted.

Words referring to relative position (upper, lower, upward, downward, top, bottom, above, below, vertical, horizontal, etc.) are only used to aid understanding of the disclosure, and do not create limitations, particularly as to the position, orientation, or use of embodiments. Similarly, words describing connections (attached, connected supported, fitted, etc.) are to be construed broadly and may include intermediate members between a connection of elements and relative movement between elements. As such, these references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are intended to be inclusive.

We claim:

1. A vehicle track assembly, comprising:
    an adjustable main frame supported for tilting movement on an axis transverse to said main frame; said main frame having spaced apart first and second ends separated by a body extending therebetween; said main frame having a topside and an underside in spaced apart relation with opposed sidewalls extending therebetween;
    said main frame first end equipped with a tensioning bracket; said tensioning bracket equipped with a first axle tube; said first axle tube oriented transverse to said main frame to accommodate a first axle with a first set of end wheels in spaced apart relation to each other;
    said end wheels for rotation on parallel transverse axes; said tensioning bracket adjustable longitudinally on said main frame;
    said main frame second end equipped with a pivotal alignment bracket; said pivotal alignment bracket equipped with a second axle tube oriented transverse to said main frame to accommodate a second axle with a second set of end wheels in spaced apart relation to each other; said second set of end wheels for rotation on parallel transverse axes;
    said body portion of said main frame equipped with a reinforcing bracket assembly pivotally attached on said main frame top side intermediate said main frame first end and said main frame second end; said reinforcing bracket equipped with an implement axle tube oriented transverse to said mainframe for pivotal movement relative to said mainframe; said implement axle tube adapted to receive an implement axle shaft secured to a vehicle frame;
    said implement axle shaft to carry an implement wheel
    a flexible endless belt extending around the first and second set of end wheels, as well as the reinforcing bracket assembly and having an upper run and a lower run for engaging a travel surface;
    a plurality of bogie wheels each having a transverse axis and each engaging the lower run of the endless belt;
    said bogie wheels attached to roller beams isolated from said main frame; said bogie wheels including a forward set of four bogie wheels on a first roller beam and a rearward set of four bogie wheels on a second roller beam; said bogie wheels supported below said main frame in suspended floating relation; said floating relation including vertical float and pitch, roll and yaw compliance; each set of bogie wheels supported for independent vertical and tilting movement relative said main frame.

2. The vehicle track assembly of claim 1, wherein said bogie wheel roller beams are isolated from said main frame by a resilient elastomeric vertical mount attached from the underside of said main frame and said pitch, roll and yaw compliance is provided by round elastomeric bushing mounts.

3. The vehicle track assembly of claim 2, wherein elastomeric vertical mount is hourglass shaped and composed of rubber.

4. The vehicle track assembly of claim 2, wherein said round elastomeric bushing mounts are composed of rubber.

5. The vehicle track assembly of claim 1, wherein the round bushing elastomeric mounts are inserted into an integral bracket rigidly connected to the main frame and the round busing elastomeric mounts are further connected to the roller beam.

6. The vehicle track assembly of claim 1, wherein the roller beams are secured to a pair of axles having outer end portions which receive bearings and hubs for the set of bogie wheels.

7. The vehicle track assembly of claim 1, wherein the tensioning bracket is connected to the main frame by tension springs and adjustable nuts on eye bolts.

8. The vehicle track assembly of claim 1, the set of rollers having horizontal axes.

* * * * *